(12) United States Patent
Hinds et al.

(10) Patent No.: US 7,805,916 B2
(45) Date of Patent: *Oct. 5, 2010

(54) SEED GATHERING DEVICE FOR USE BY AN AGRICULTURAL HARVESTER

(75) Inventors: Michael L. Hinds, Thibodaux, LA (US); John S. Hickman, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/358,367

(22) Filed: Jan. 23, 2009

(65) Prior Publication Data

US 2010/0186363 A1    Jul. 29, 2010

(51) Int. Cl.
*A01D 45/10* (2006.01)

(52) U.S. Cl. .......................................... 56/62

(58) Field of Classification Search ................. 56/13.5, 56/14.1–14.3, 14.5, 33–35, 62, 126–130, 56/10.2 E, 14.9, 15.8, 17.1, DIG. 10
See application file for complete search history.

(56) References Cited

U.S. PATENT DOCUMENTS

| | | | |
|---|---|---|---|
| 1,781,961 A | | 11/1930 | Smith |
| 2,553,855 A | * | 5/1951 | Haapala ........................ 56/500 |
| 3,462,928 A | * | 8/1969 | Schreiner et al. ............... 56/104 |
| 4,270,337 A | | 6/1981 | Pinto |
| 4,365,461 A | | 12/1982 | Schuett |
| 4,578,934 A | * | 4/1986 | West et al. .................... 56/12.9 |
| 4,581,878 A | | 4/1986 | Vida et al. |
| 4,587,799 A | * | 5/1986 | Thomas et al. ................ 56/14.6 |
| 4,845,930 A | * | 7/1989 | Dow ............................ 56/113 |
| 4,999,983 A | * | 3/1991 | Britt et al. ..................... 56/107 |
| 5,058,369 A | * | 10/1991 | Garner ......................... 56/13.9 |
| 6,272,820 B1 | | 8/2001 | Otten et al. |
| 6,374,587 B1 | * | 4/2002 | Wubbels et al. ............... 56/103 |
| 7,040,980 B1 | | 5/2006 | Kestel |
| 7,681,388 B1 | * | 3/2010 | Hinds et al. ................... 56/126 |
| 7,694,501 B1 | * | 4/2010 | Hinds et al. ................... 56/63 |
| 2007/0209347 A1 | * | 9/2007 | Malmros et al. ............... 56/126 |

FOREIGN PATENT DOCUMENTS

DE            8814148         6/1989

OTHER PUBLICATIONS

European Search Report, 7 Pages, May 7, 2010.

\* cited by examiner

*Primary Examiner*—Thomas B Will
*Assistant Examiner*—Mai T Nguyen

(57) ABSTRACT

A work machine for harvesting a cane crop having a lower crop material gathering device, the work machine including a chassis and an upper crop material gathering device coupled to said chassis. The upper crop material gathering device including at least one moving device configured to substantially surround a stalk of a cane crop plant as said at least one moving device moves, and a stalk engaging device positioned proximate to the at least one moving device. The stalk engaging device being configured to pull the stalk from the at least one moving device, thereby stripping grain from a head of the cane crop plant.

6 Claims, 4 Drawing Sheets

SEED GATHERING DEVICE FOR USE BY AN AGRICULTURAL HARVESTER

FIELD OF THE INVENTION

The present invention relates to agricultural harvesters, and, more particularly, to harvesters for harvesting cane or stalk-like crops.

BACKGROUND OF THE INVENTION

Two known types of stalk-like crops in the North American market are sugar cane and sorghum. Other stalk or cane type crops are recently receiving more attention with increased interest in bio-energy such as miscanthus, energy cane and giant reed. During the harvesting of sugar cane, it is known to "top" the sugar cane plant by cutting off the top portion of the plant using a separate cutter head and allowing the top of the plant to simply fall to the ground.

Sorghum is a major cereal grain that is one of the oldest known crops and is used as a staple food in many places in Africa and Asia. Sorghum is a major feed grain crop in the U.S., Mexico, Argentina, Australia, and South Africa. It is believed that sorghum was introduced into the United States in the 1700's and some believe that Benjamin Franklin introduced the first grain sorghum crop. The seed of grain sorghum is the smallest of the spring planted field crops, such as corn and soybeans.

Sorghum is a member of the grass family that is classified into four groups, those being: grain sorghums, grass sorghums, sweet sorghums, and broomcorn. Broomcorn is grown for the brush or the branches of the seed cluster with the fibers thereof being used for the making of brooms. Sweet sorghums are grown for the production of sorghum syrup which is produced from the juices pressed from the stems that is then subsequently boiled to the proper thickness. Animal feed and silage can also be made from sweet sorghums. Grassy sorghums are grown for green feed and hay, often reaching 10 feet in height. Grain sorghums are grown especially for their rounded, starchy seeds. Some grain sorghums grow as much as 15 feet or more tall with the seed being used as seed grain and the plant utilized for silage. Nearly all grain sorghums are much shorter than the other three types of sorghum and as such the collection devices used to collect seed typical grain sorghum are not ideal for collecting seed from very tall cane crops.

The use of sorghum for the production of ethanol has brought additional emphasis to the economics of sorghum production. It is known to gather sorghum grain by utilizing a regular grain header on a combine that is utilized to cut the heads from the sorghum and then process the heads through the threshing portion of a combine. A row crop attachment can be utilized to help the pickup and intake of the crop. The row crop attachments fit in front of the grain header cutter bar and have gathering points, gathering chains, and kicker wheels like a forage harvester head. Sorghum stems often catch and choke the straw walkers of a combine causing inconvenience and lost time in the cleaning of the straw walkers. Grain sorghum stalks are smaller and normally wetter to harvest than corn stalks and are more likely to be chopped up and delivered into the grain tank. Pieces of stalk return to the cylinder in the tailings and can exacerbate this condition. To handle this situation the chaffer section may be covered with sheet metal to keep the stalks out of the return flow to the cylinder.

For the harvesting of the sorghum stalk, sugar cane harvesters can be utilized that cut the stalk into billets for transfer to a wagon for further processing. Sugar cane harvesters may include a top cutting tool for the cutting off of the seed portion of the sugar cane. The seed portion of the sugarcane plant is discarded in this harvesting system since it has low amounts of sugar content. In the harvesting operation it is advantageous to use a height of cut that is substantially close to the surface of the ground to optimize the amount of the stalk harvested yet high enough to minimize any damage to the equipment by contact with the ground. Another problem with harvesting the cane too close to the ground results in increased damage to the plant, thereby decreasing the long term productivity of the cane plantation.

What is needed in the art is a sorghum or a cane or stalk-like crop harvester which removes and processes the seed in an effective and efficient manner.

SUMMARY OF THE INVENTION

The invention in one form is directed to a work machine for harvesting a cane crop having a lower crop material gathering device, the work machine including a chassis and an upper crop material gathering device coupled to said chassis. The upper crop material gathering device including at least one moving device configured to substantially surround a stalk of a cane crop plant as said at least one moving device moves, and a stalk engaging device positioned proximate to the at least one moving device. The stalk engaging device being configured to pull the stalk from the at least one moving device, thereby stripping grain from a head of the cane crop plant.

The invention in another form is directed to an upper crop material gathering device couplable to a work machine for harvesting a cane crop having a chassis to which is attached a lower crop material gathering device. The upper crop material gathering device including at least one moving device configured to substantially surround a stalk of a cane crop plant as said at least one moving device moves, and a stalk engaging device positioned proximate to the at least one moving device. The stalk engaging device being configured to pull the stalk from the at least one moving device, thereby stripping grain from a head of the cane crop plant.

DETAILED DESCRIPTION OF THE INVENTION

Figure 1:
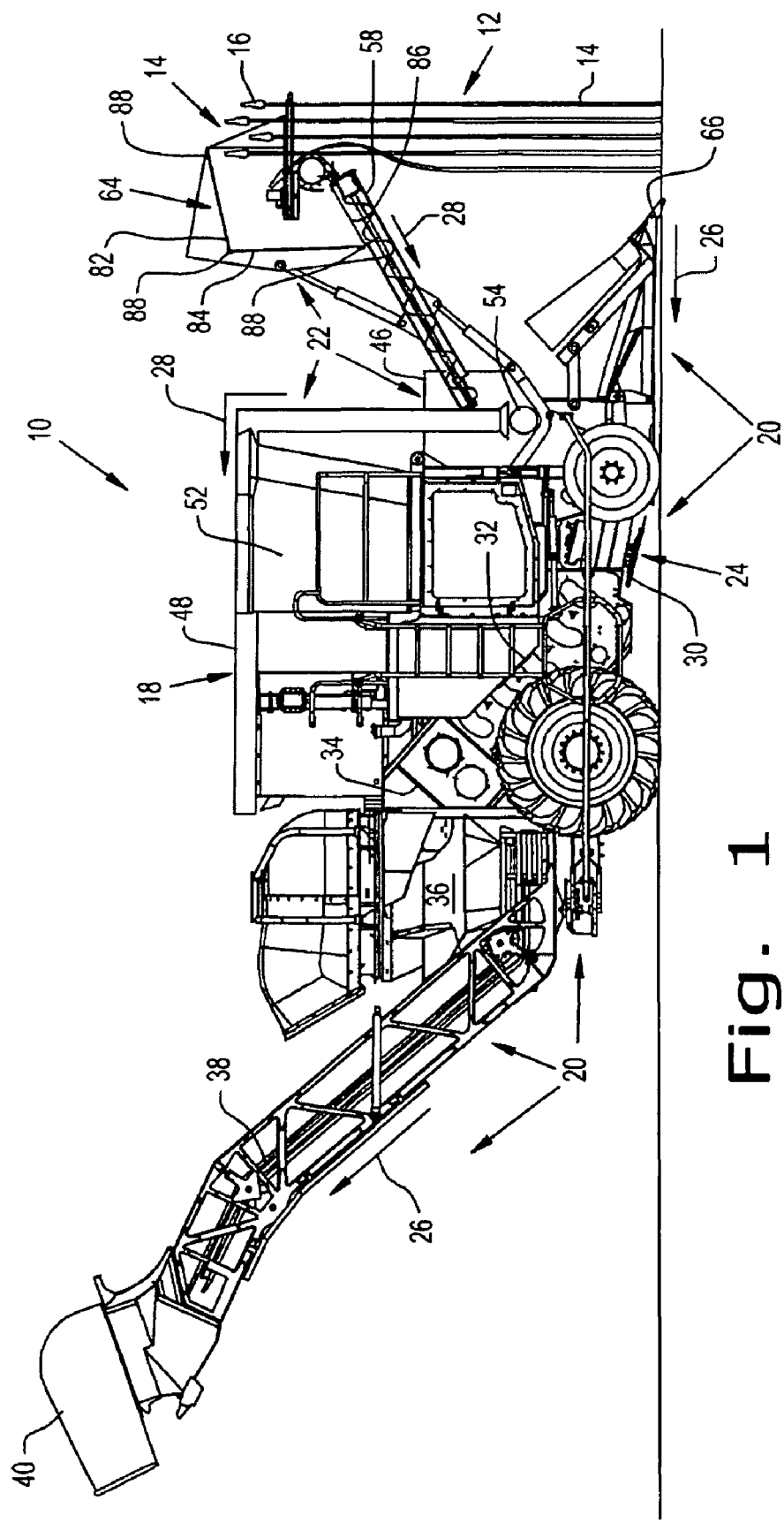
FIG. 1 is a side view of an embodiment of an agricultural harvester of the present invention.
Figure 2:
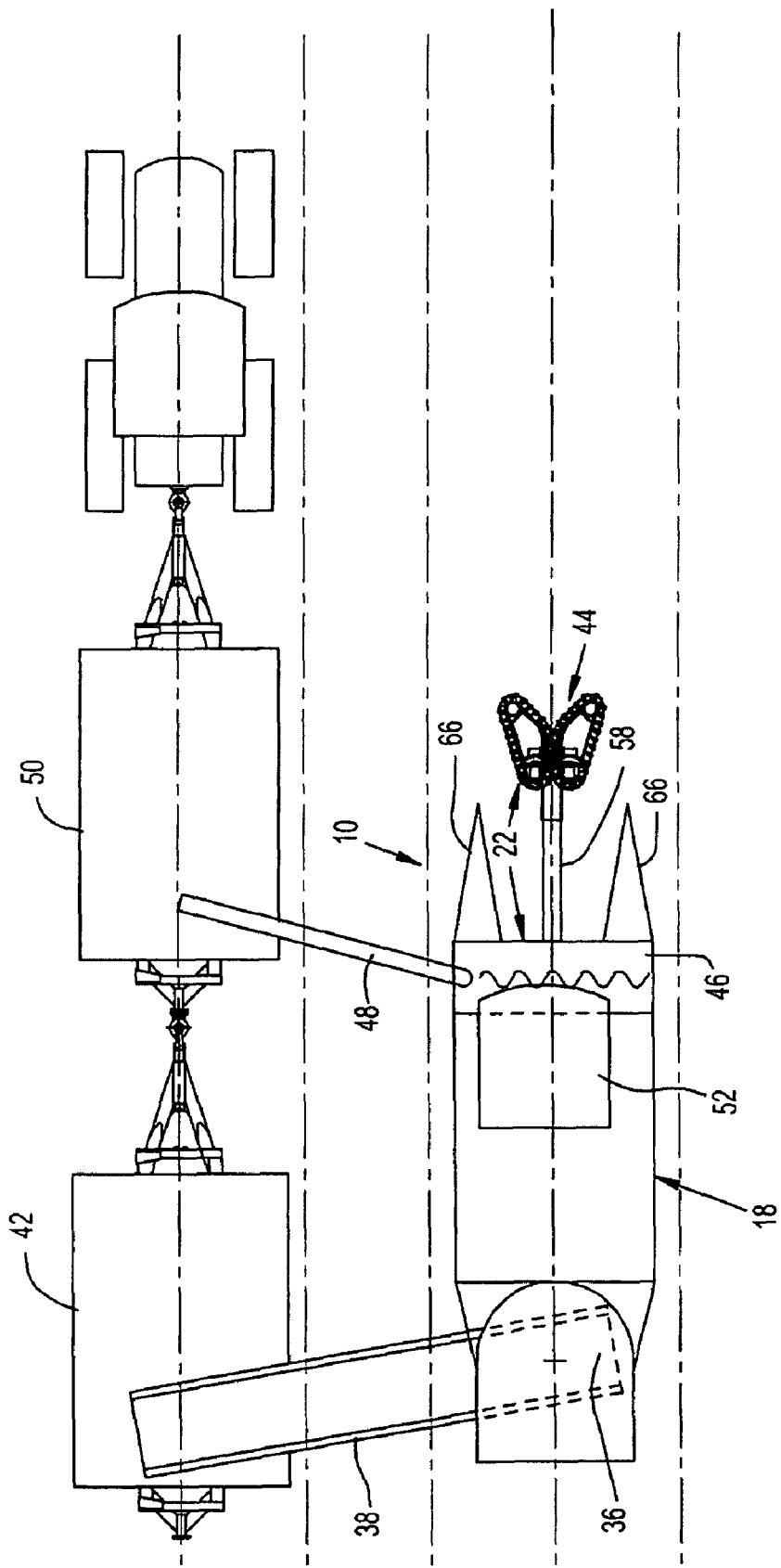
FIG. 2 is a top view of the harvester shown in FIG. 1, illustrating simultaneous unloading of both seed crop material and biomass crop material.

Referring now to FIGS. 1 and 2, there is shown an embodiment of an agricultural work machine in the form of a harvester 10 for a stalk-like crop 12 including both biomass crop material 14 and upper seed heads 16. The biomass crop material 14 may include both stalks and leaves, each of which may have value for certain applications, such as livestock feed, sugar production, ethanol production, etc.. In the embodiment shown, crop 12 is a cane crop in the form of sweet sorghum but could be a different type of crop.

Harvester 10 generally includes a base unit 18 carrying both a biomass harvester sub-system 20 and seed harvester sub-system 22. Each of biomass harvester sub-system 20 and seed harvester sub-system 22 are carried by the frame or chassis of base unit 18, with seed harvester sub-system 22 being positioned generally above biomass harvester sub-system 20. Biomass harvester sub-system 20 is used for harvesting the biomass crop material 14, and seed harvester sub-system 22 is used for separately and independently harvesting and processing seed from seed heads 16. Seed harvester sub-system 22 is also referred to as an upper crop material gathering device 22 and biomass harvester sub-system 20 is also referred to as a lower crop material gathering device 20.

More particularly, biomass harvester sub-system 20 has a general flow path 26 of biomass crop material 14 through harvester 10 (FIG. 1) which is below a general flow path 28 of seed from the seed heads 16 through seed harvester sub-system 22. The separate flow paths 26 and 28 allow the biomass crop material 14 and seed crop material from seed heads 16 to be separately processed and off-loaded from harvester 10.

Biomass harvester sub-system 20 includes a biomass harvester 24 carried by base unit 18. The biomass harvester 24 includes a base cutter 30 which cuts the stalks of crop 12 near ground level. The biomass harvester sub-system 20 further includes a set of feed rollers 32, chopper unit 34, temporary storage bin 36 (also referred to as an "elevator basket"), elevator 38 and secondary extractor 40. Each of feed rollers 32, chopper unit 34, elevator 38 and secondary extractor 40 are of conventional construction on a sugar cane harvester and thus not described further herein. For example, chopper unit 34 chops the stalks of the biomass crop material into predetermined size billets.

However, according to an aspect of the present invention, temporary storage bin 36 at the downstream side of chopper unit 34 provides temporary holding of biomass crop material 14 prior to being discharged from secondary extractor 40 into a dump wagon 42 or other suitable portable container (FIG. 1). The ability to temporarily hold the biomass crop material onboard harvester 10 can be beneficial, e.g., when opening a field where the dump wagon 42 cannot drive along side of harvester 10.

Seed harvester sub-system 22 generally includes a seed harvester 44, grain storage tank 46, and discharge conveyance 48. Discharge conveyance 48 is used to discharge the processed seed from grain storage tank 46 to a dump wagon 50 or other suitable portable container (FIG. 1). In the illustrated embodiment, discharge conveyance 48 is configured as an auger, but could also be configured, e.g., as a belt conveyor or chain conveyor.

Grain storage tank 46 is carried onboard base unit 18, preferably at the front of the operator's station 52 on base unit 18. Grain storage tank 46 may be constructed with a suitable shape (such as a rectangular shape with a V-bottom) from a suitable material (such as a metal or plastic). A cross-auger 54 positioned in the V-bottom moves the processed seed toward discharge conveyance 48. Cross-auger 54 and discharge conveyance 48 may be actuated using a single actuator, such as an electronic switch on a console panel within operator's station 52.

Figure 3:
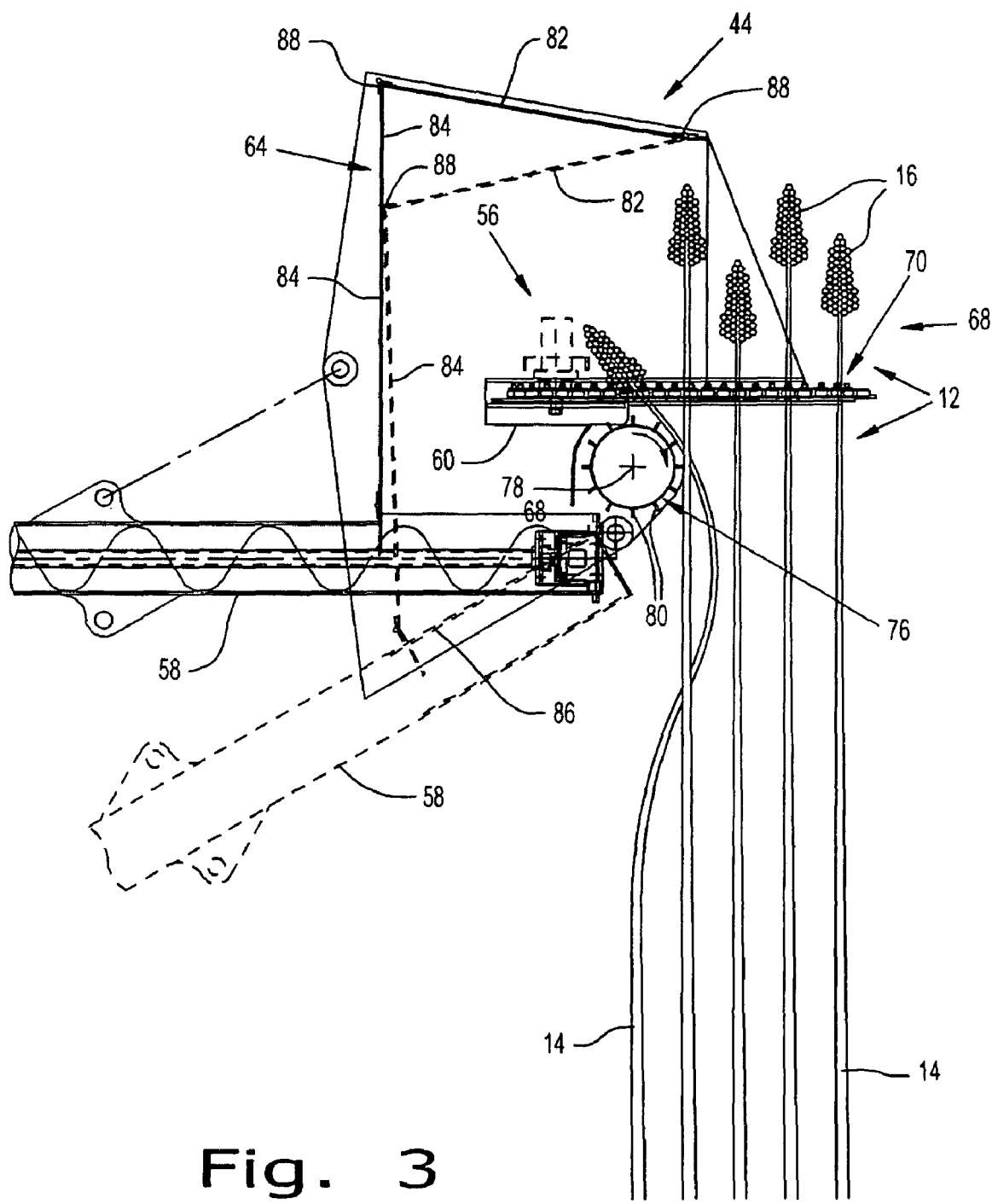
FIG. 3 is a side, partially sectional view of one embodiment of a seed harvester of the present invention.
Figure 4:
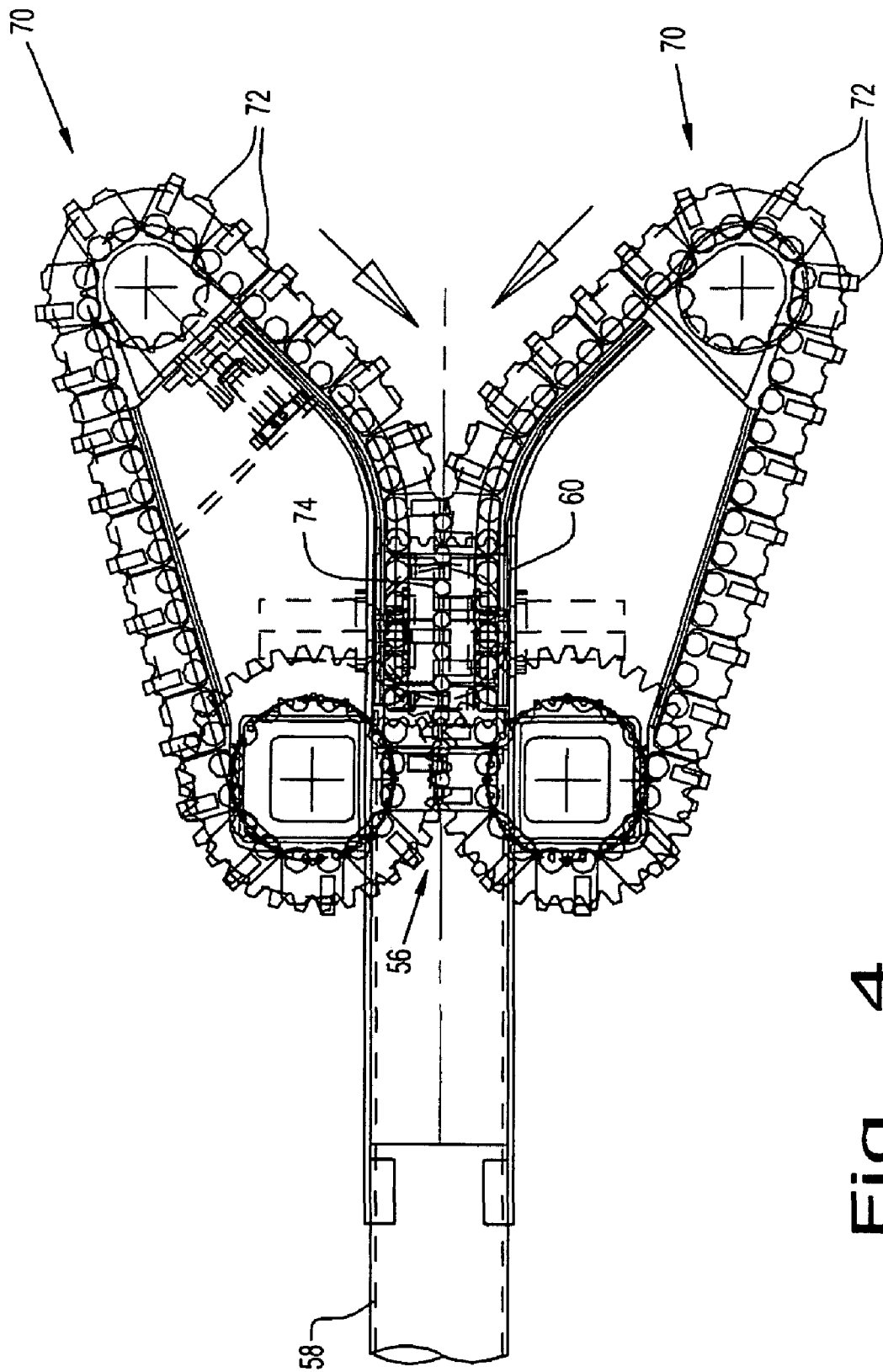
FIG. 4 is a top view of the seed harvester shown in FIG. 3.

Seed harvester 44 is positioned above and forward of base cutter 30 (relative to a working direction of harvester 10). Seed harvester 44 generally includes a seed removal unit 56 and seed conveyance 58. Seed conveyance 58 serves as a support member for connecting the chassis to the seed removal unit 56 and has an internal grain moving device. Seed conveyance 58 conveys the seed or seed heads from seed harvester 44 to base unit 18 for further processing within seed harvester sub-system 22. In FIGS. 3 and 4, seed conveyance 58 is configured as an auger 58 for transporting seeds to base unit 12. However, seed conveyance 58 can be differently configured depending on the application, such as a chain driven conveyor or a cleated belt, etc.

Seed removal unit 56 harvests the seed from seed heads 16 by stripping the seeds from seed heads 16. Referring to FIGS. 3 and 4, a seed removal unit 56 is shown including a seed stripper 60 which strips the seeds from seed heads 16.

During a field operation, and referring to FIGS. 3 and 4, the seeds are stripped from seed heads 16 using seed stripper 60. The seeds are held in a grain gathering tunnel 64, which can accommodate a changing height of seed removal unit 56, and thus accommodate a changing angular orientation relative to auger 58. The seed is conveyed through auger 58 to grain storage tank 46 where it is held until discharged from base unit 18 using discharge conveyance 48. Concurrently, the biomass crop material (i.e., stalks and leaves) are aligned with snout 66, cut off with base unit 18, conveyed to chopper unit 34 using feed rollers 32, and deposited in temporary storage bin 36. The biomass crop material can then be selectively discharged from temporary storage bin 36 by an operator through engagement of elevator 38 and secondary extractor 40.

The stalks of crop 12 include a peduncle 68, which is generally defined as the section of the stalk between the uppermost leaf of crop 12 and head 16. The leaves of crop 12 being omitted for the sake of clarity. Seed stripper 60 includes moving devices 70 in the form of gathering chains 70 to which are attached a plurality of stripper plates 72. Stripper plates 72 are connected to chains 70 and are configured to meet in such a way as to form stripper plate holes 74 which surround the stalk of crop 12 as the stalks are gathered toward seed stripper 60. Stalk engaging device 76, in the form of a roller 76, rotates about a substantially horizontal axis 78. Protrusions 80 extend from roller 76 and engage the stalks causing the stalks to be pulled in a downward direction. The stalks are bent toward grain gathering tunnel 64 by the combined effect of the movement of chains 70 and the stalk encountering roller 76. As protrusions 80 move the stalk in a downward direction the seeds on seed head 16 are stripped from the stalk. The seeds are collected by grain gathering tunnel 64 and conveyed to a holding area by way of seed conveyance 58.

Protrusions 80 may be in the form of a wavy plate configured to grip the stalk to pull it through stripper plate hole 74. The pulling of the stalk is additionally assisted by the movement of harvester 10 along the ground.

Grain gathering tunnel 64 includes a top plate 82, a back plate 84 and a bottom plate 86. Hinges 88 allow plates 82, 84 and 86 to move as seed conveyance 58 may be repositioned to accommodate different heights of crop 12 and specifically the locations of heads 16. An alternate position of grain gathering tunnel 64 and of seed conveyance 58 is illustrated by the dashed lines in FIG. 4. Seed conveyance 58, which may for example be in the form of a conveyor or auger, has an opening that corresponds to an opening in bottom plate 86 so that grain gathered in grain gathering tunnel 64 can be conveyed therefrom. Although bottom plate 86 is shown as being along the top edge of seed conveyance 58 it may be located along the side of seed conveyance 58 and may be sloped to direct the grain to seed conveyance 58. Grain gathering tunnel 64 also has sides that are generally parallel with the direction of movement of harvester 10 and may be in the form of a plate or a flexible element configured to adapt to the movement of plates 82, 84 and 86.

Having described the preferred embodiment, it will become apparent that various modifications can be made without departing from the scope of the invention as defined in the accompanying claims.

The invention claimed is:

1. A work machine for harvesting a cane crop having a lower crop material gathering device, the work machine comprising:
   a chassis; and
   an upper crop material gathering device coupled to said chassis, said upper crop material gathering device including:
      at least one moving device having a plurality of stripper plates including a first stripper plate and a second stripper plate, configured to substantially surround a stalk of a cane crop plant as said at least one moving device moves;
      a stalk engaging device in the form of a roller rotating about a generally horizontal axis and being located generally beneath said at least one moving device, said roller being configured to pull the stalk in a generally downward direction from said at least one moving device thereby stripping grain from a head of the cane crop plant the stalk being substantially surrounded by said first stripper plate and said second stripper plate prior to said stalk engaging device pulling the stalk from between said first stripper plate and said second stripper plate; and,
      a grain gathering tunnel positioned adjacent to said at least one moving device and said roller to receive the grain, the grain gathering tunnel having a top plate, a back plate and a bottom plate, said top plate being hingedly connected to said back plate, said back plate being hingedly connected to said bottom plate.

2. The work machine of claim 1, wherein said roller has a plurality of protrusions extending therefrom, said protrusions being configured to engage the stalk.

3. The work machine of claim 1, further comprising a support member connecting said chassis to said upper crop material gathering device, said support member including an internal grain moving device for receiving grain from said grain gathering tunnel, said support member being configured to change a height said upper crop material gathering device is above the ground while maintaining said at least one moving device substantially parallel to the ground.

4. An upper crop material gathering device couplable to a work machine for harvesting a cane crop having a chassis to which is attached a lower crop material gathering device, the upper crop material gathering device comprising:
   at least one moving device a plurality of stripper plates including a first stripper plate and a second stripper plate, configured to substantially surround a stalk of a cane crop plant as said at least one moving device moves;
   a stalk engaging device in the form of a roller rotating about a generally horizontal axis and being located generally beneath said at least one moving device, said roller being configured to pull the stalk in a generally downward direction from said at least one moving device thereby stripping grain from a head of the cane crop plant the stalk being substantially surrounded by said first stripper plate and said second stripper plate prior to said stalk engaging device pulling the stalk from between said first stripper plate and said second stripper plate; and,
   a grain gathering tunnel positioned adjacent to said at least one moving device and said roller to receive the grain said grain gathering tunnel having a top plate, a back plate and a bottom plate, said top plate being hingedly connected to said back plate, said back plate being hingedly connected to said bottom plate.

5. The upper crop material gathering device of claim, 4 wherein said roller has a plurality of protrusions extending therefrom, said protrusions being configured to engage the stalk.

6. The upper crop material gathering device of claim, 4 further comprising a support member connectable to the chassis, said support member being coupled to said at least one movable device, said roller and said grain gathering tunnel, said support member including an internal grain moving device for receiving grain from said grain gathering tunnel, said support member being configured to change a height that said upper crop material gathering device is above the ground while maintaining said at least one moving device substantially parallel to the ground.

* * * * *